No. 764,003. PATENTED JULY 5, 1904.
C. C. PECK.
HEATING SYSTEM FOR GREENHOUSES OR OTHER BUILDINGS.
APPLICATION FILED MAR. 2, 1903.
NO MODEL. 2 SHEETS—SHEET 2.
FIG. II.
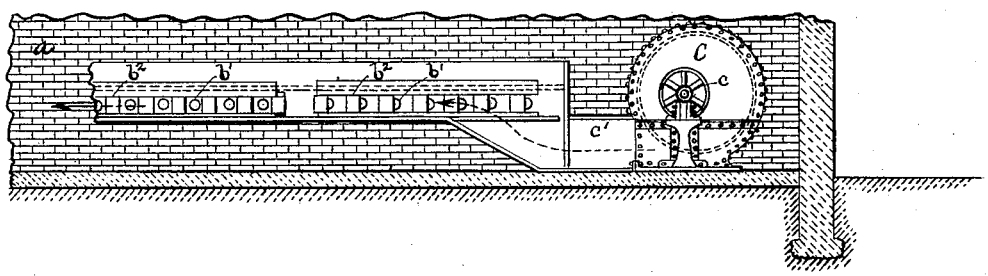
FIG. III.
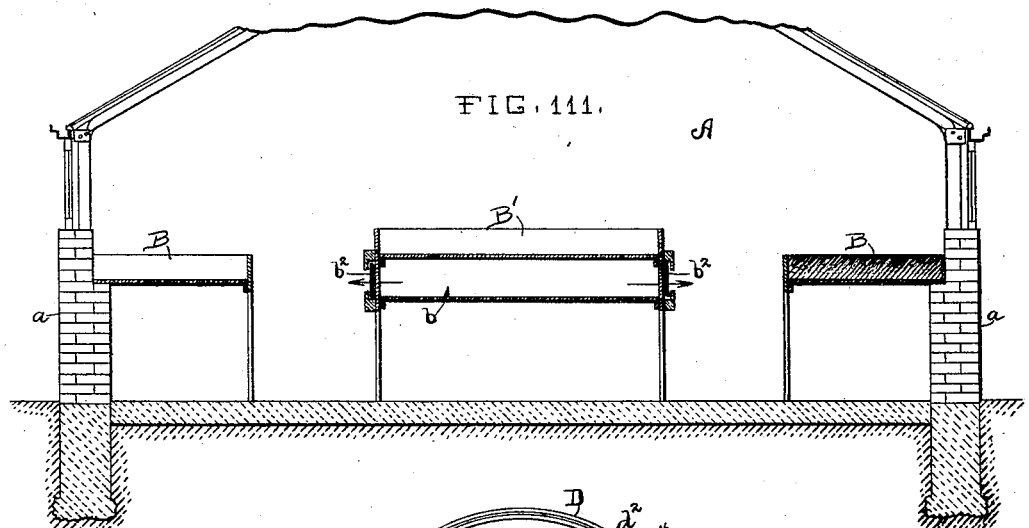
FIG. IV.
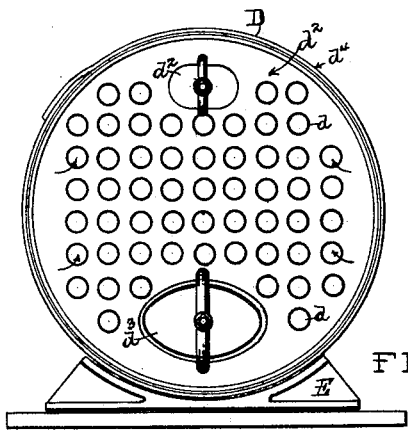
WITNESSES:
Jno. H. McInarney
Chas. J. Shepard Jr.
INVENTOR:
Cassius Carroll Peck No. 764,003. Patented July 5, 1904.

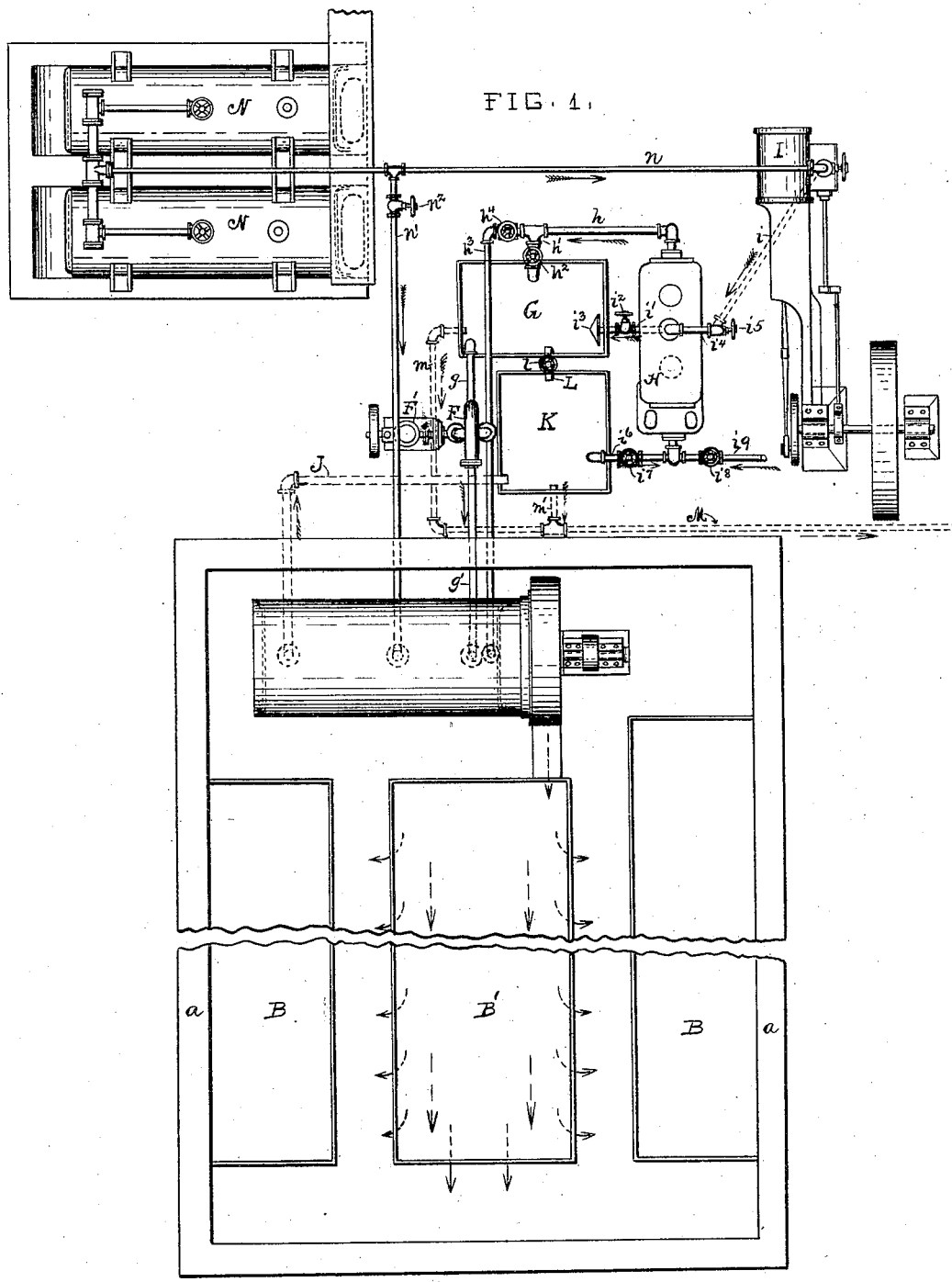

UNITED STATES PATENT OFFICE.

CASSIUS CARROLL PECK, OF ROCHESTER, NEW YORK.

HEATING SYSTEM FOR GREENHOUSES OR OTHER BUILDINGS.

SPECIFICATION forming part of Letters Patent No. 764,003, dated July 5, 1904.

Application filed March 2, 1903. Serial No. 145,835. (No model.)

*To all whom it may concern:*

Be it known that I, CASSIUS CARROLL PECK, residing at Rochester, in the county of Monroe and State of New York, have invented a certain new and useful Heating System for Greenhouses or other Buildings, of which the following is a specification sufficient to enable others skilled in the art to which it appertains to make and use the same.

My invention is especially adapted to heating various classes of greenhouses in which many varieties of plants are grown and preserved; but it is also applicable to heating factories and large buildings and spaces which can be advantageously warmed by heated air mechanically circulated. It may be classed as a fan system of heating; but it embodies material modifications of previous practice in this general class of heating. It is adapted to nearly all the applications where a fan system of heating is suitable—that is to say, where mechanically-moved heated air can be properly employed for heating, evaporating, drying, or any other use.

The objects sought and obtained are compactness of combined air and forcing devices, efficiency of heating-surface, avoidance of trouble from air in heating apparatus, even heating of air, and avoidance of traps, air-pockets, and trouble from lack of circulation.

The system is of especial advantage in utilizing exhaust-steam from engines, it being practicable to employ it both in connection with condensing-engines and with non-condensing engines, as will be hereinafter shown.

The elements and many of the details of my invention are illustrated in the accompanying drawings, in which like parts in the several figures are indicated by the same letters.

Figure 1 is a plan view illustrating my invention by proper grouping and connection of the several parts. Fig. 2 is a side elevation of the fan-blower and of the central propagating bed or table shown in Fig. 1, with arrows indicating the course of air-currents, and also shown in cross-section in Fig. 3. Fig. 3 is a cross-section of a greenhouse and of three propagating beds or tables. Fig. 4 is an elevation of that end of the air-heater which is opposite the fan, as shown in Fig. 1.

In the several views arrows feathered on both sides indicate flow of steam, arrows feathered on one side the flow of water, and unfeathered arrows the direction of air-currents.

In Fig. 3, A indicates a greenhouse of an ordinary type of construction, having side walls $a$, roof $a'$, and floor $a^2$ and provided with side-wall plant-tables B B and a central plant-table B', which has beneath it an air-duct $b$ with side vents $b'$, dampered at $b^2$, as shown in Fig. 2. The movement of heated air, impelled by fan C, is indicated by arrows on plan shown in Fig. 1. The end view of air-duct $b$ opposite fan C is not shown; but arrows in Fig. 1 are intended to show that said end is ventilated and dampered by a slide-damper in same manner as the sides. Fan C is directly attached to air-heater D, the opposite end of which is shown in elevation in Fig. 4, where $d\ d$ are air-heating tubes, $d'$ the head, having a hand-hole $d^2$ above and a manhole $d^3$ below the tubes, and shell $d^4$, which rests on cast-iron cradles, one of which is shown at E. The head of heater at the fan end is of like construction with that at the opposite end except there is no hand-hole or manhole.

In Fig. 1, F is a centrifugal pump driven by vertical engine F' and connected with primary tank G by suction-pipe $g$ and with air-heater D by delivery-pipe $g'$. Tank G can be used either as a reservoir for condensing-water delivered by the circulating-pump of surface-condenser H, through pipe $h$, and branch $h'$, having a valve $h^2$, or as a heating-tank when said condenser is not in use and exhaust-steam from engine I is sent through pipe $i$ and branch $i'$, having valve $i^2$ to noiseless heater-head $i^3$ into water in tank G. When condenser H is used, exhaust-steam is received into tank G through branch pipe $i^4$, having valve $i^5$, and a jet-condenser can be employed in place of a surface-condenser, as the temperature of condensing-water at discharge from condenser can be maintained at about the same point in either case. Also, any other form of water-moving mechanism may be substituted for centrifugal pump F. Likewise pulley $c$ (shown in connection with fan C) is intended to be symbolical of any suitable application of power for driving the fan. By closing valve $h^2$ on branch pipe $h'$ and opening valve $h^4$ on branch pipe $h^3$ the circulating-pump of condenser can deliver condensing-water directly into the body of air-heater D, from which water is returnable by pipe J to secondary tank K, the suction-pipe $i^6$ of said circulating-pump having valve $i^7$, being connected with tank K, so as to draw the supply of condensing-water from said tank, and thus heat it for recirculation through air-heater D, or by closing valve $i^7$ and opening valve $i^8$ in branch suction-pipe $i^9$ condensing-water can be taken from any other source, as must be done when water in tank K becomes too hot for effectiveness in condensing steam and maintaining required degree of vacuum for engine I or other engines which I symbolizes and which depend on condenser H for vacuum. When all of the supply of condensing-water for condenser H cannot be taken from tank K on account of high temperature, a portion may be thus used and another portion taken from a cooler source of supply through pipe $i^9$ by proper adjustment of valves $i^7$ and $i^8$ on the respective suction-pipes.

Tank G can serve at the same time as a reservoir for discharge-water from condenser H and as a heater for bringing up the temperature of heating-water for the heat-circuit to any desired point for delivery to air-heater D. In this case exhaust-steam from one or more non-condensing engines would be sent to heater-head $i^3$ through pipe $i'$, this pipe being shut off from pipe $i^4$, which latter would be connected with one or more engines running condensing. Tanks G and K are connected near their tops by an overflow-pipe L, having a valve $l$ for the purpose of insuring that each tank shall be kept filled, as desired, the surplus from both being carried to waste by branch pipes $m \cdot m$ and main pipe M. Air-heater D is preferably set at such level with respect to tanks G and K as to remain always filled with water, and the arrangement of return water-pipe J assumes this condition. When the top of heater D is set as high as the tops of tanks G and K, (which tops should be about alike in height,) then return-pipe J should have a U-bend equal in height to the top of heater D in order to keep the latter completely filled with water circulated by pump F.

Boilers N N are intended primarily for supplying steam to one or more engines, as I, through pipe $n$, the exhaust-steam from which engine or engines goes to heat water for air-heater D, as already described; but when the supply of exhaust-steam is insufficient or when no exhaust-steam is available live steam from said boilers is taken by pipe $n'$, having valve $n^2$, either directly into water in air-heater D through a noiseless delivery-head or into an equivalent coil in heater D for maintaining the temperature of its water at any required point. In either case surplus water resulting from condensation of steam can be returned into boilers N N by a receiver and automatic pump or other equivalent means; but whenever exhaust-steam is used in conjunction with live steam for heating the water-supply of air-heater D one or both of the tanks G and K and a pump F must be employed to effect circulation between said tanks and heater D.

The grouping of parts in Fig. 1 is not intended to represent distances at which the several devices and constructions are required to be set one from another, exact distances not being essential. Thus boilers, engines, condensers, tanks, and water-forcing pumps are naturally assembled in one building or in buildings near together, while air-heaters and fans will usually be located in the building or buildings which are to be heated, and these latter may be at considerable distance from the source of water and heat supply, it being one of the advantages of the system of forced circulation of the heat-vehicle that heat can be sent long distances and without regard to levels of piping, there being no special difficulty and but a small percentage of loss of heat from well-insulated pipes in locating heat-delivery at a mile or even more from boilers.

Having described means and method of supplying air-heater D with hot water, it remains to make clear the manner of heating and distributing air to space which requires to be warmed.

Heater D is similar in construction to a return tubular boiler—that is to say, it has, in common with said type of boiler, a shell, heads, tubes, a manhole, and a hand-hole. It differs, however, in having tubes in practically the whole of the tube-space, in having the flanges of both heads turned outward, and in having the fan end constructed for direct attachment to a fan-case, although where necessary or most convenient fan C can be set apart from heater D and connected thereto by a pipe. Said fan can be used either for forcing air through tubes $d$ of said heater or, as shown in Fig. 1, for drawing air through said tubes and then forcing it where required for warming or other purpose. In Figs. 1, 2, and 3 unfeathered arrows indicate that the arrangement of the fan C provides for forcing air which said fan draws through and is heated by tubes $d$ into pipe $c'$ and air-duct $b$ beneath plant-table B', thence through holes $b'$ in sides and end of said duct into the body of greenhouse A. By providing a proper number of said holes and having them of sufficient size and dampered, as shown at $b^2$, even distribution of the volume of air and amount of heat delivered by fan C can be secured. To this end the number and total area of said holes should give a considerable excess of area required for the fan capacity, so that on windy days holes on one side of duct $b$ opposite the windy side can be closed to a considerable extent in order to send most of the volume of moving air out on the windy side of said duct. Air-duct $b$ can usually be located with advantage near the floor-level, so as to have heat-delivery as low down as practicable; but it is shown in a more elevated position for the sake of greater clearness. Similar ducts can also be located beneath side tables B B and connected with delivery-pipe $c'$ of fan C. When the shell of heater D is left uncovered, it acts as a radiator for warming that end of greenhouse A. On this account and also because flow of air into the body of greenhouse A is constantly toward heater D the greatest amount of air passing through duct $b$ must be discharged nearest the end farthest removed from fan C in order to attain an even temperature throughout the whole greenhouse. Constant and positive movement of air throughout the greenhouse in a continuous circuit counteracts the effects of air-leaks in causing cold spots and tends to keep the whole greenhouse-inclosure uniformly warmed. Fan action and air-delivery can be reversed, air being drawn into duct $b$ and forced by fan C through tubes $d$ in heater D; but in this case heated air is not sent into greenhouse A at so low a level, and hence is not so efficient in evenly heating the whole inclosed space.

The use of a fan for drawing or forcing air through heater D not only enables an even distribution of air through greenhouse A to be effected, but permits the amount of heating-surface to be the smallest possible, because of efficiency of said surface when in contact with moving air.

This system is suitable for warming various classes of buildings, scarcely any modification being necessary up to the point of air-distribution, which latter is only a matter of properly proportioning and arranging air-ducts, with size and form of air-heater to correspond, to get good results in economy, even temperature, ventilation, and avoidance of excessive velocity of air-currents which would cause objectionable drafts or movement of dust, and in these respects each installation requires special adaptations to meet individual conditions.

I do not confine myself to the form of air-heater D as shown, as the form must be governed in a measure by conditions of location and use. Thus a rectangular form of shell can be employed, in which case air-tubes can be set either lengthwise or crosswise or both ways, or tubes in any form of heater can be set vertically. The essential feature of this part of my invention is that water of the heating-circuit shall occupy the body of the heater and that air-tubes for heating air to warm the space which it is desired to warm shall pass through the body of water in the heater.

Air heated by this system can be used for drying solid substances and evaporating liquids.

Having described my invention, what I claim, and desire to secure by Letters Patent, is—

1. In a heating system, the combination of an air-heater; a primary and a secondary tank; a liquid-circuit in operative relation with said air-heater, taking water from said primary tank and delivering it into said secondary tank; a connection between said tanks; a condenser receiving water from said secondary tank and delivering it to said liquid-circuit; means for conducting exhaust-steam to said condenser; valve mechanism for controlling the flow of liquid through said liquid-circuit; means for circulating the liquid through said circuit; and means for forcing air through said air-heater and for distributing the same, substantially as set forth.

2. In a heating system, the combination of an air-heater, a liquid-circuit and a live-steam pipe in operative relation with said air-heater, said liquid-circuit including a primary tank and a secondary tank, and a condenser receiving water from the secondary tank and delivering into the primary tank, valve mechanism for controlling the flow of liquid through said liquid-circuit; means for conducting exhaust-steam to said condenser, means for circulating the liquid through said circuit, and means for forcing air through said air-heater and for distributing the same, substantially as set forth.

3. In a heating system, the combination of an air-heater; a liquid-circuit, including a primary tank and a secondary tank; and a condenser receiving water from the secondary tank and delivering into the primary tank; valve mechanism for controlling the flow of liquid through said liquid-circuit; means whereby exhaust-steam may be delivered either to said primary tank or said condenser; means for circulating the liquid through said circuit; and means for forcing air through said air-heater and for distributing the same, substantially as described.

4. In a heating system, the combination of an air-heater; a liquid-circuit; including a primary tank and a secondary tank; and a condenser receiving water from the secondary tank and delivering into the primary tank; means whereby said condenser may deliver condensing-water either to said primary tank or said air-heater; valve mechanism for controlling the flow of liquid through said liquid-circuit; means whereby exhaust-steam may be conducted to said condenser; means for circulating the liquid through said circuit; and means for forcing air through said air-heater and for distributing the same, substantially as described.

5. In a heating system, the combination of an air-heater; a liquid-circuit, including a primary tank and a secondary tank, and a condenser receiving water from the secondary tank and delivering into the primary tank; means whereby said condenser may deliver condensing-water either to said primary tank or said air-heater; means whereby exhaust-steam may be delivered either to said primary tank, or said condenser; valve mechanism for controlling the flow of liquid through said liquid-circuit; means for circulating the liquid through said circuit; and means for forcing air through said air-heater and for distributing the same, substantially as described.

CASSIUS CARROLL PECK.

Witnesses:
JNO. N. MCANARNEY,
CHAS. G. SHEPARD.